Figure 34:
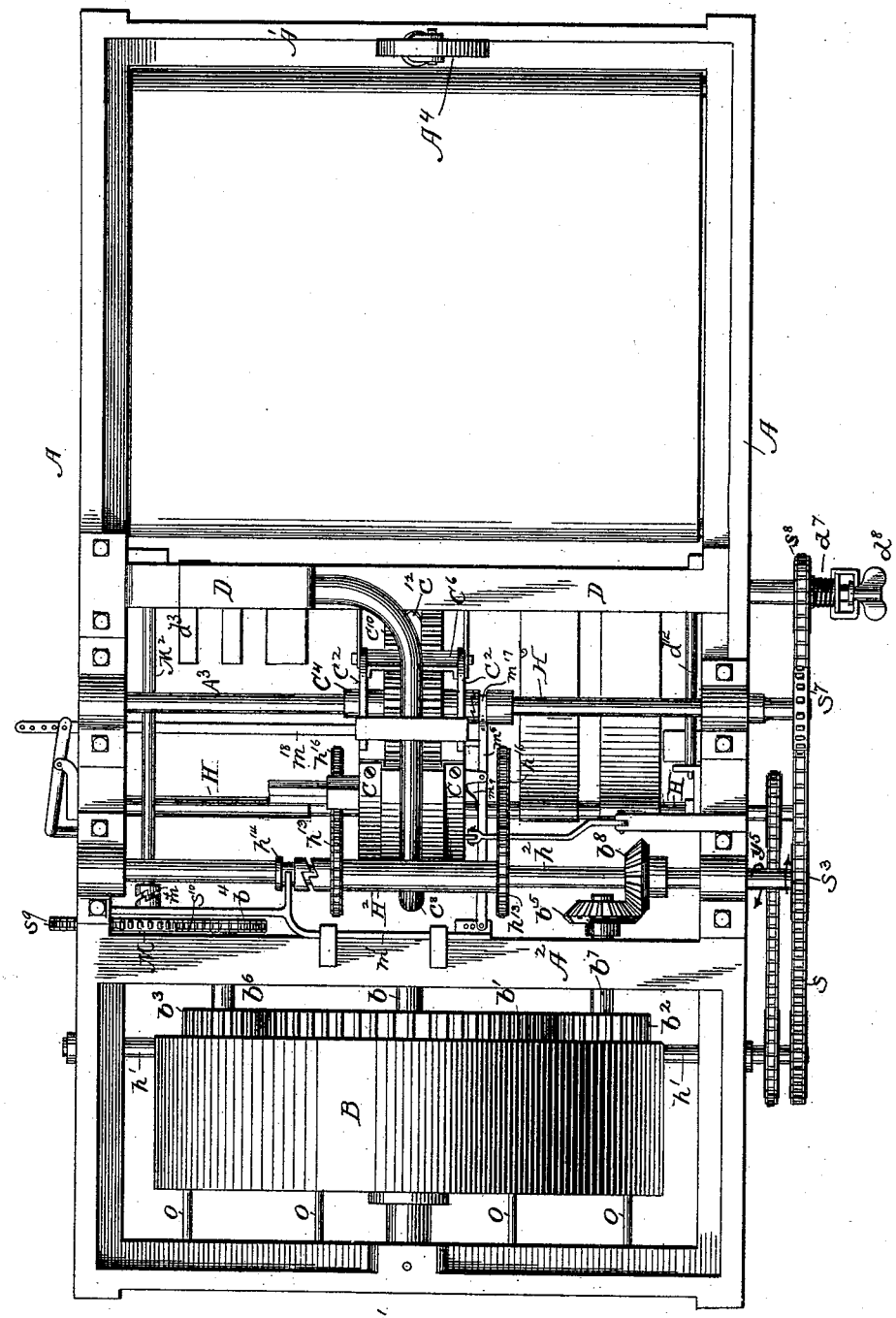

(No Model.) 12 Sheets—Sheet 1.
F. P. RICHARDS.
STRAW BINDER FOR HARVESTERS.
No. 495,121. Patented Apr. 11, 1893.
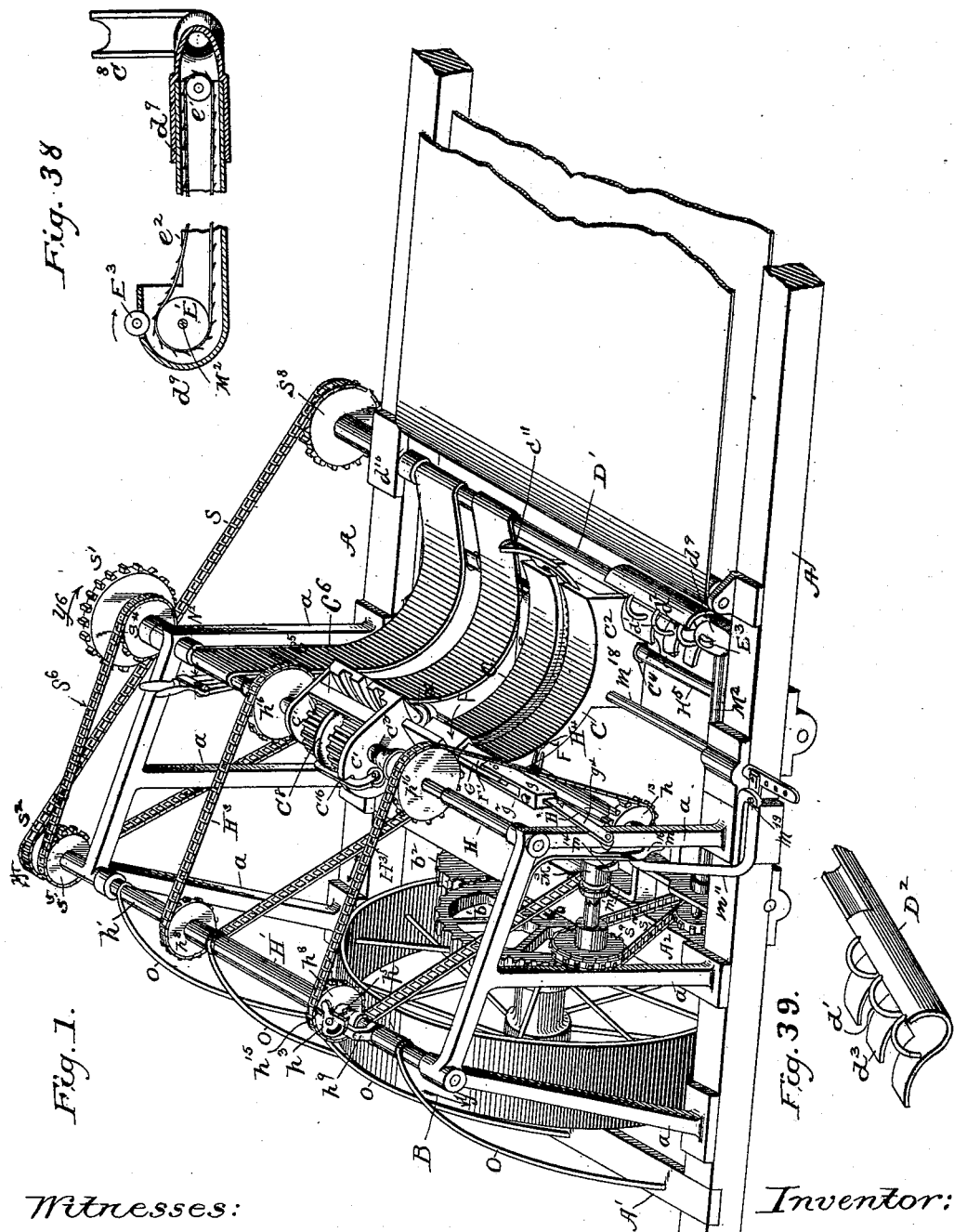
Witnesses:
Inventor:

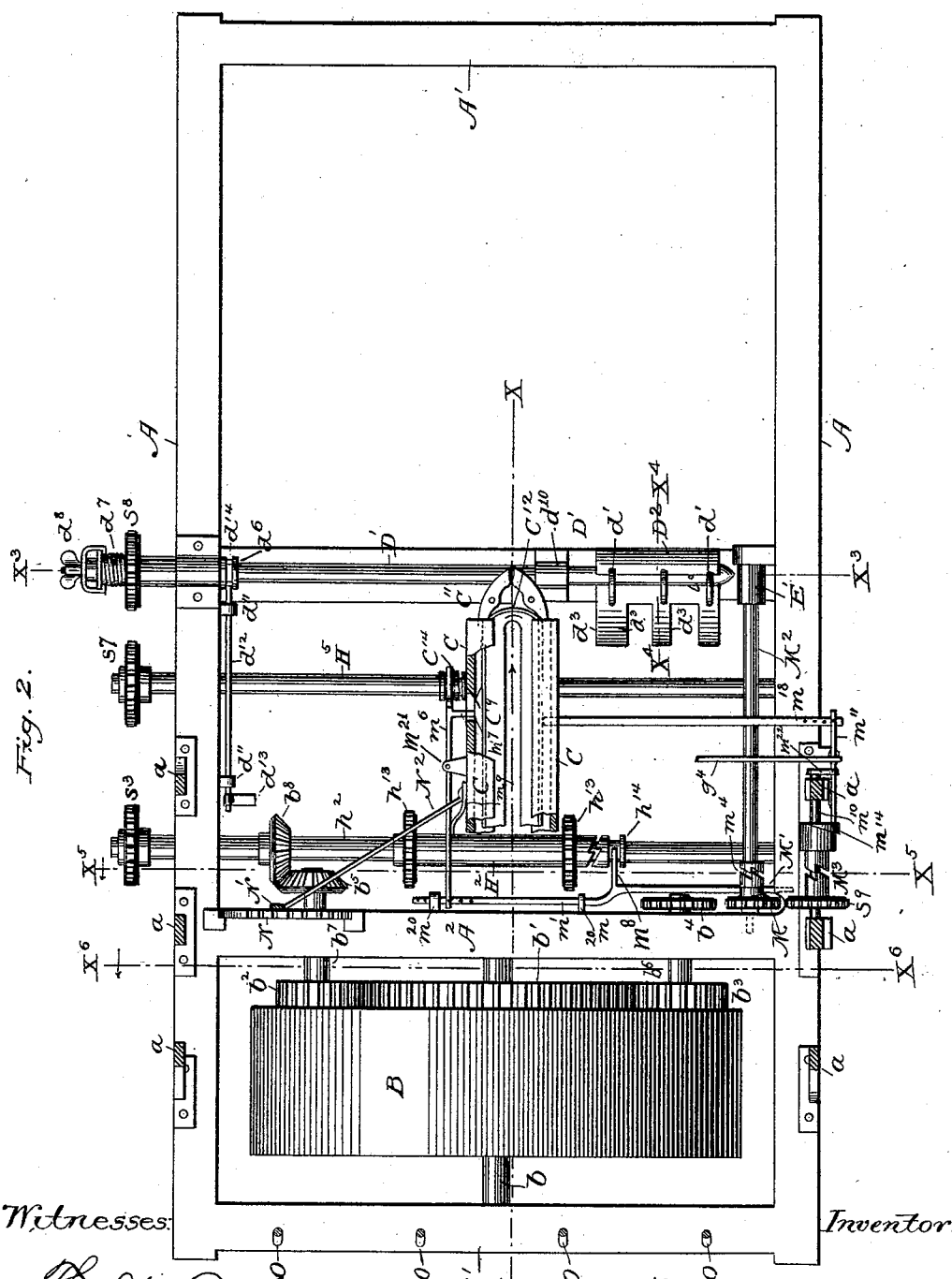

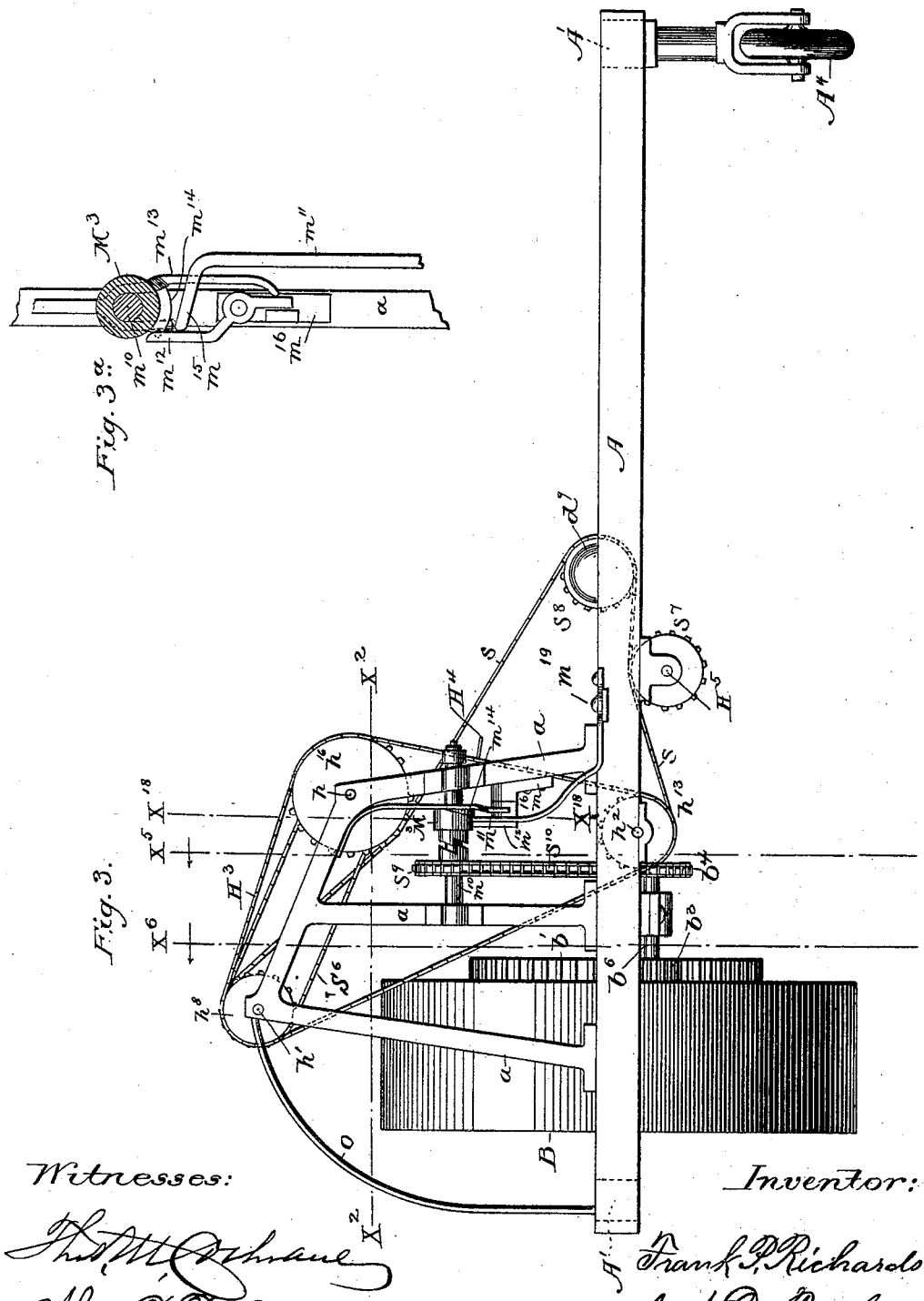

(No Model.) 12 Sheets—Sheet 4.
F. P. RICHARDS.
STRAW BINDER FOR HARVESTERS.
No. 495,121. Patented Apr. 11, 1893.
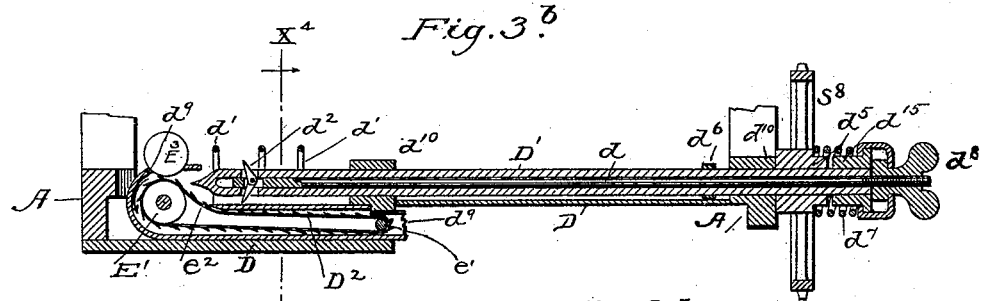

(No Model.) 12 Sheets—Sheet 5.
F. P. RICHARDS.
STRAW BINDER FOR HARVESTERS.
No. 495,121. Patented Apr. 11, 1893.
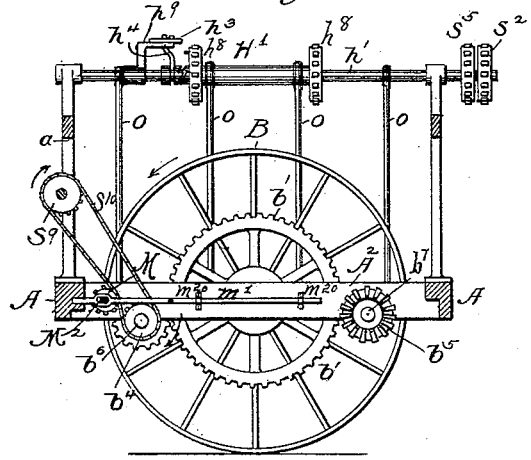
Witnesses:
Inventor:
Frank P. Richards,
by N. DuBois his Atty.

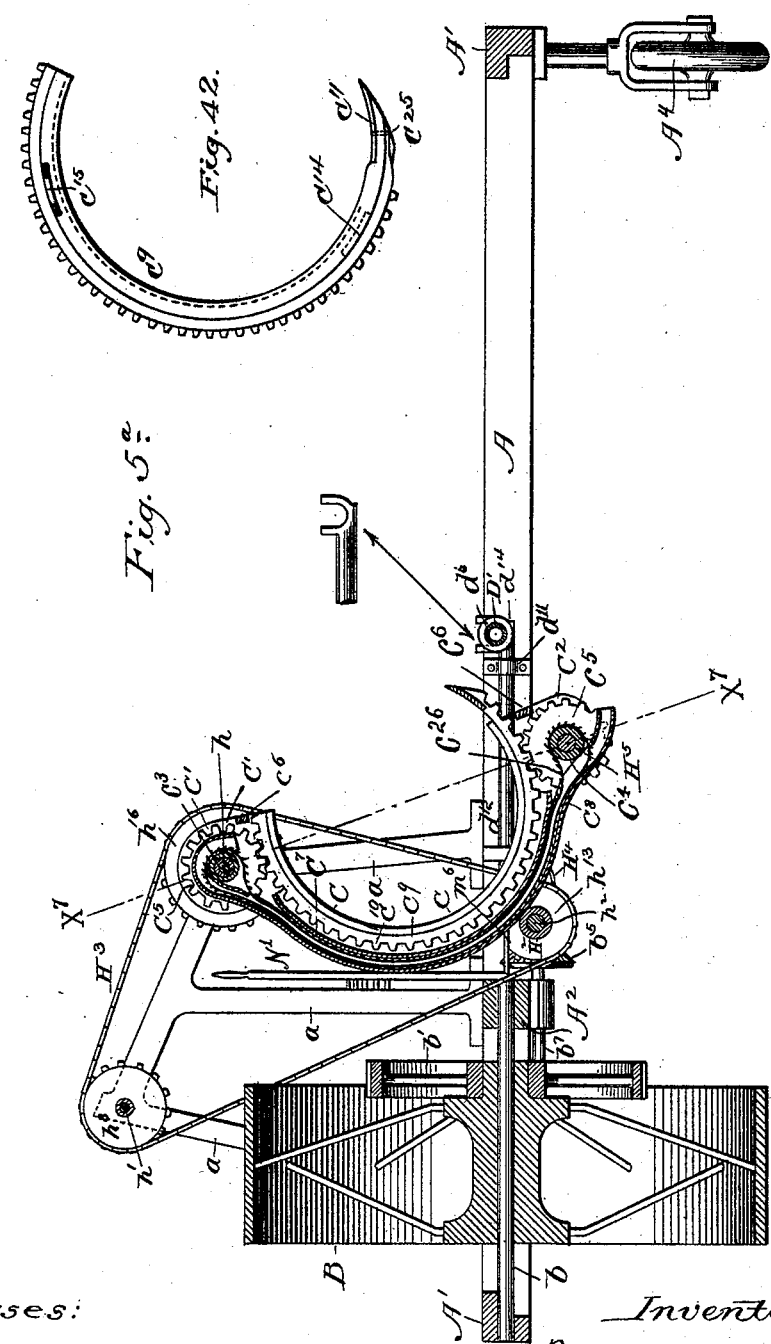

(No Model.)  
F. P. RICHARDS.  
STRAW BINDER FOR HARVESTERS.
No. 495,121. Patented Apr. 11, 1893.
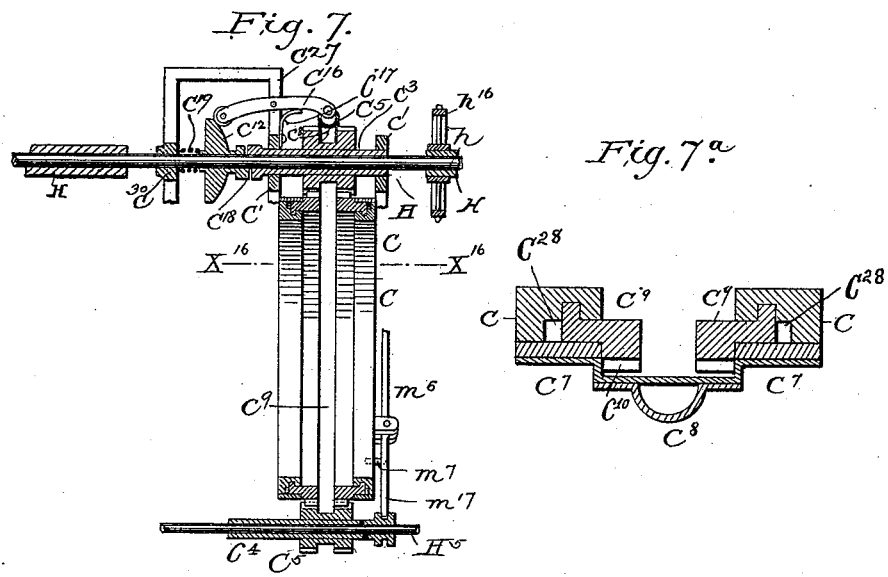
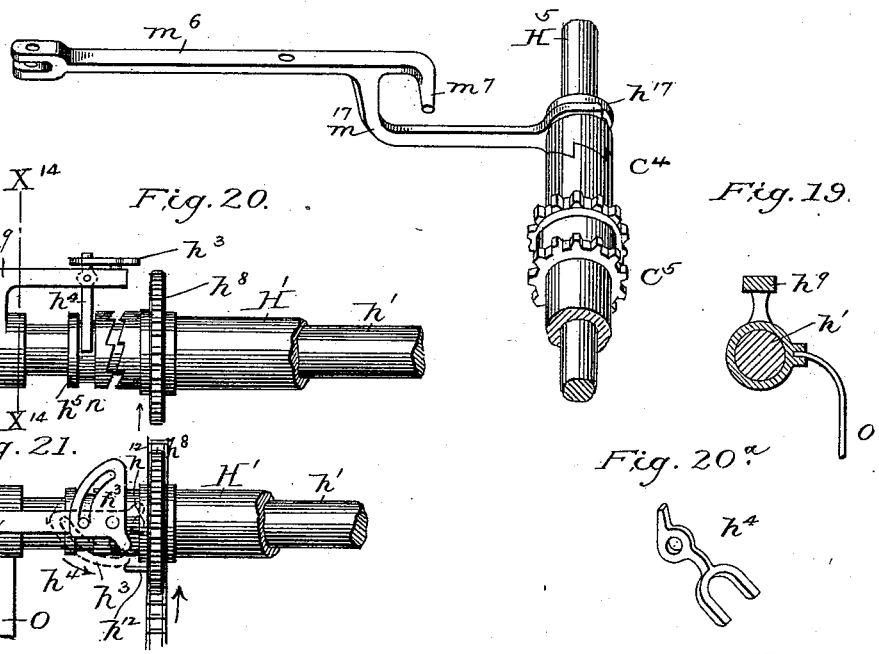
Witnesses:  
Inventor:  
Frank P. Richards  
by A. DuBois, his Atty.

(No Model.) 12 Sheets—Sheet 8.
F. P. RICHARDS.
STRAW BINDER FOR HARVESTERS.
No. 495,121. Patented Apr. 11, 1893.
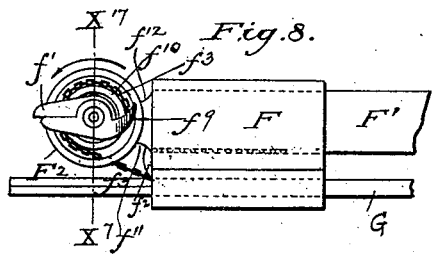
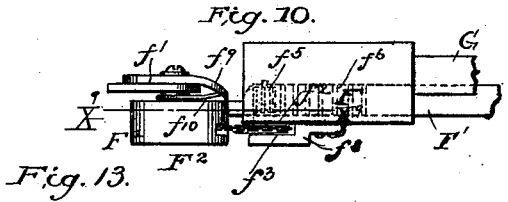
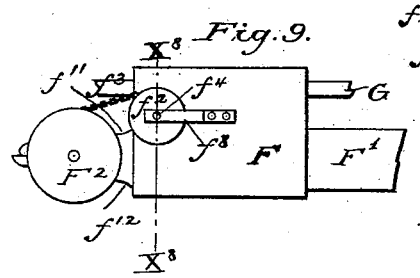
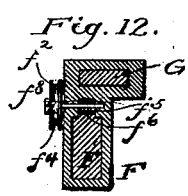
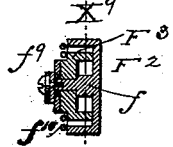
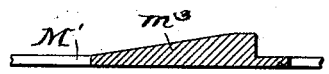
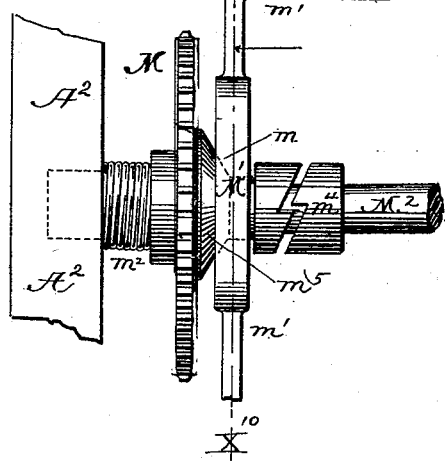
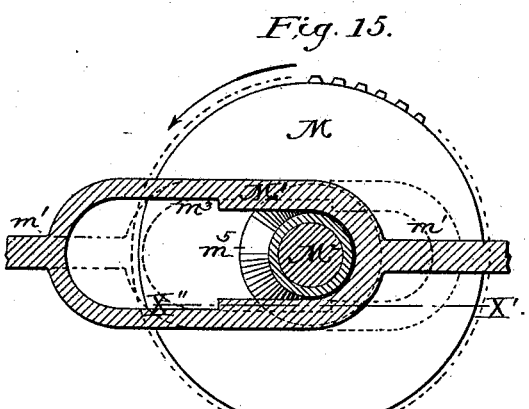
Witnesses:
Inventor:
Frank P. Richards.
by N. DuBois his Atty (No Model.)   12 Sheets—Sheet 9.
F. P. RICHARDS.
STRAW BINDER FOR HARVESTERS.
No. 495,121. Patented Apr. 11, 1893.
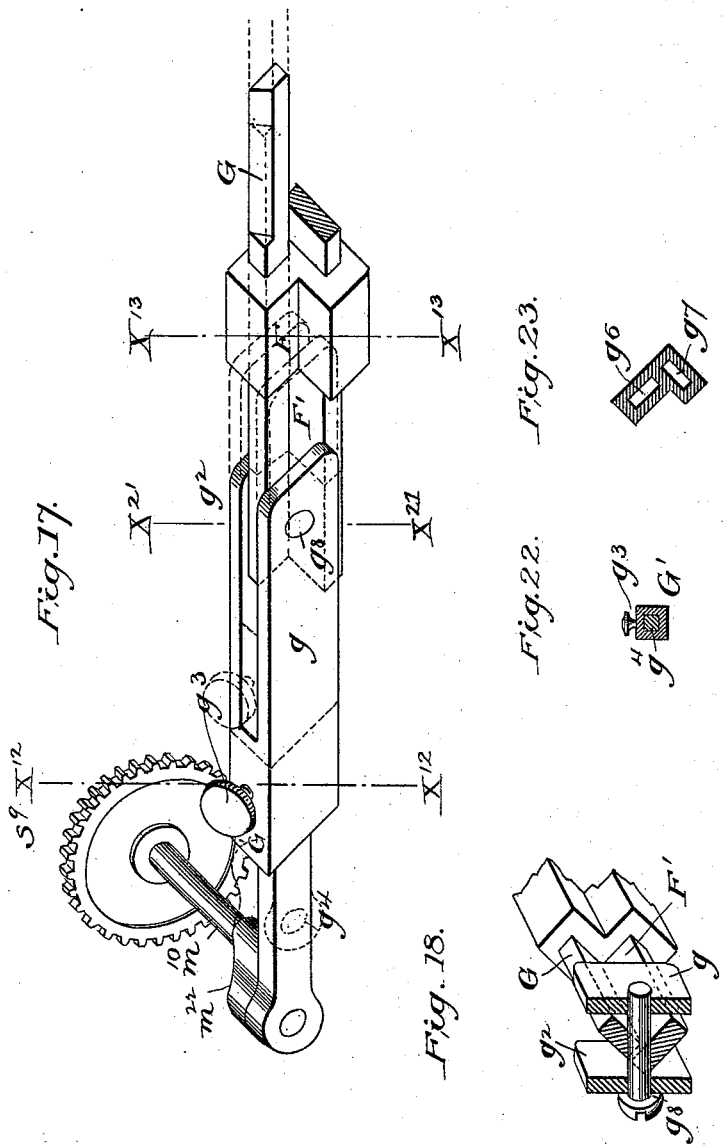
Witnesses:
Tad A. Bailey
B. E. Carver.
Inventor:
Frank P. Richards
by N. Du Bois his atty.

(No Model.) 12 Sheets—Sheet 10.
F. P. RICHARDS.
STRAW BINDER FOR HARVESTERS.

No. 495,121. Patented Apr. 11, 1893.

Witnesses:
Inventor:
Frank P. Richards,
by N. DuBois his Atty.

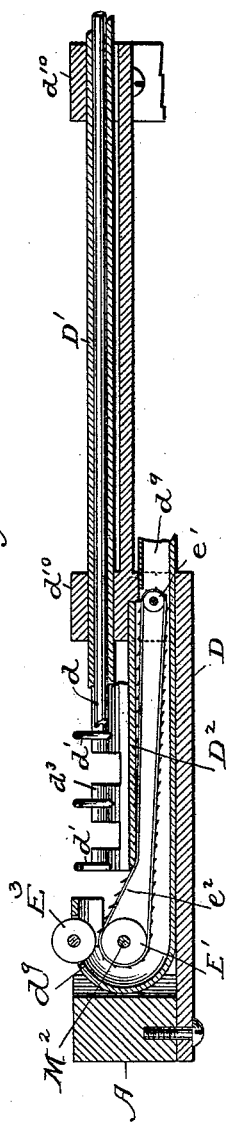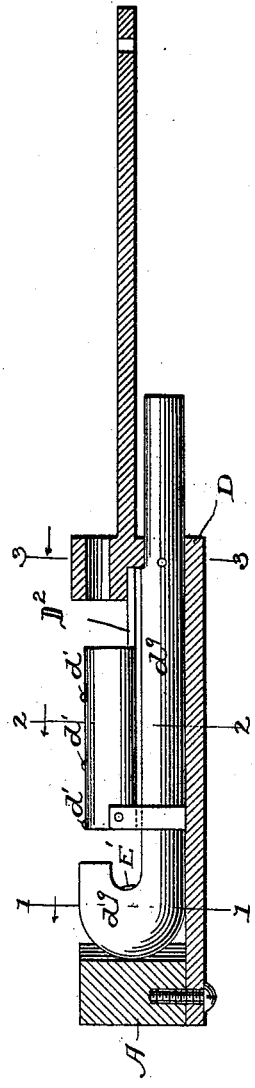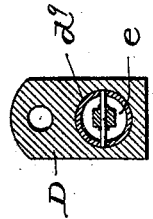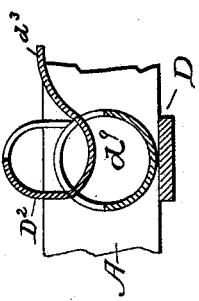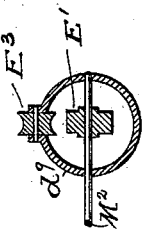

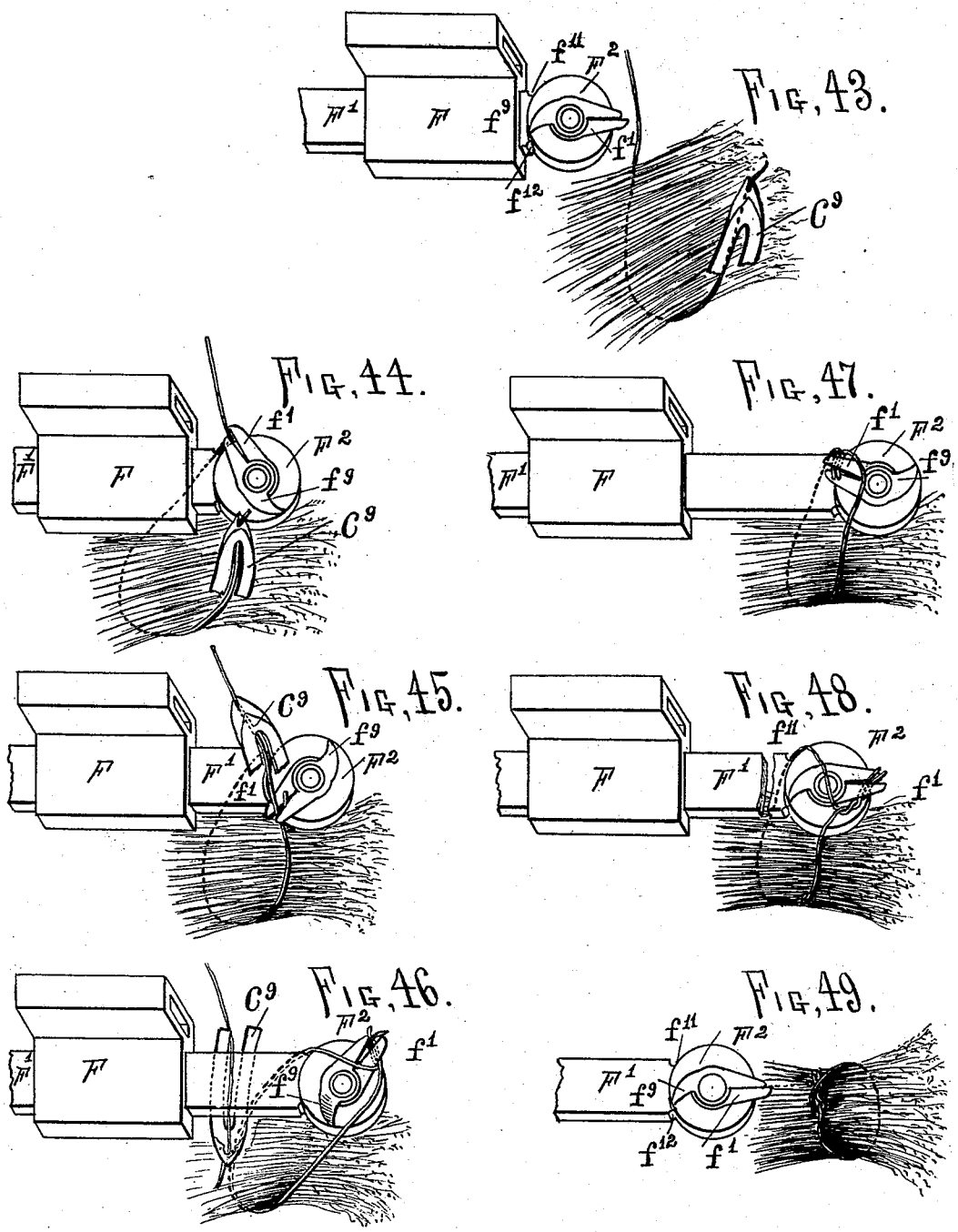

United States Patent Office.

FRANK P. RICHARDS, OF EDINBURG, ILLINOIS, ASSIGNOR OF ONE-HALF TO GEORGE P. HARRINGTON, OF SAME PLACE.

STRAW-BINDER FOR HARVESTERS.

SPECIFICATION forming part of Letters Patent No. 495,121, dated April 11, 1893.

Application filed February 9, 1891. Serial No. 380,869. (No model.)

*To all whom it may concern:*

Be it known that I, FRANK P. RICHARDS, a citizen of the United States, residing at Edinburg, in the county of Christian and State of Illinois, have invented a new and useful Straw-Binder for Harvesters, of which the following is a specification.

My invention relates to harvesters of that class in which the grain being cut is conveyed onto a suitable platform or receptacle and is there automatically bound with a band formed from the straw of the cut grain and after being bound is elevated and discharged from the machine.

I lay no claim to the mechanism for cutting the grain, as my binder may be used with any cutting apparatus such as is commonly used.

The purposes of my invention briefly stated are as follows: First.—To provide curved grain receptacles in connection with certain novel and effective means for supporting them on the machine in position to co-operate with twisting mechanism near the lower ends of the receptacles. Second.— To provide certain novel means for separating from the body of grain conveyed from the platform conveyer to the receptacles, that part of the grain which is to form the bundle. Third.—To provide a needle of novel and improved construction. Fourth.—To provide a needle frame of novel and improved construction and means for supporting same, also to provide simple and effective means for guiding the movements of the needle within the needle frame. Fifth.—To provide certain novel and effective means for supporting guiding and driving the needle, whereby the needle may be rotated continually in the same direction. Sixth.—To provide certain novel features of construction and combinations of mechanism whereby the twister is adapted to take from the grain accumulating on the grain receptacles, sufficient straw to make a band. Seventh.—To provide novel and effective means for twisting the straw into a band. Eighth.—To provide certain novel features of construction and combinations of mechanism whereby the twister shaft may be so adjusted as to control the quantity of straw seized by the twister for forming the band, thereby regulating the size of the band. Ninth.—To provide certain novel features of construction and combinations of mechanism adapted to convey the twisted band from the twister to the needle: also adapted to carry the twisted band up to and around the bundle and place the band in position for its ends to be twisted together, and the band cut off, and tucked. Tenth.— To provide certain novel features of construction and combinations of mechanism whereby the position of the needle frame and the connected parts may be adjusted relative to the grain receptacles for the purpose of regulating the position of the band on the bundle. Eleventh.—To provide certain novel features of construction and combinations of mechanism, adapting the needle and co-operating mechanism to be started by the downward pressure of the straw on the band. Twelfth.—To provide certain novel and effective means for tightening the band on the bundle and twisting and tucking under the ends of the band. Thirteenth.—To provide certain novel and effective mechanism whereby the grain receptacles, the band twister, the needle, the band conveyer, the knife and the tucker, may co-operate with each other to receive the cut grain from the platform conveyer of the harvester, to take from the body of the grain a sufficient quantity of straw to form a band, to twist the straw into a band, and to convey the twisted band from the twister up to and around the bundle, to cut off the band and to twist together and tuck under the ends of the band. Fourteenth.— To provide certain novel features of construction and combinations of mechanism adapted to the simultaneous lateral adjustment of both the band tucking and band cutting mechanism, relative to the position of the needle frame. Fifteenth.—To provide for automatically starting and stopping the band twisting mechanism by means of the pull of the twisted band on the end of the twister. Sixteenth. — To provide certain novel means whereby the band twisting mechanism may be brought into action at the will of the operator. Seventeenth.—To provide means for starting and stopping the needle at proper intervals. Eighteenth.—To provide certain novel means whereby the band conveyer, the tucking, and the end twisting mechanism, the band cutting mechanism, and the elevating mechanism may be automatically started and stopped by the needle, and may co-operate with the needle to perform their several functions in due season. Nineteenth.—To provide certain novel features of construction and combinations of mechanism adapted to convey the band from the twister and deliver it to the needle, whatever may be the position of the needle relative to the grain receptacles, the elevators and the band twister. Twentieth.—To provide certain novel features of construction and combinations of mechanism whereby the bound bundles may be taken in succession from the grain receptacles as soon as bound and conveyed up over the machine and deposited on the ground, also to provide certain novel mechanism and means for operating same whereby the motion of the elevators may be automatically reversed after the elevators have discharged a bundle from the machine, and the elevators may be run back and stopped in position to receive the next bundle. Twenty-first.—To provide suitable actuating and connecting mechanism so that all the devices shown and described shall cooperate in due season to perform their several functions as hereinafter fully set forth and claimed.

Figure 1— is a perspective front view of the machine. Fig. 2— is a top view of the main-frame and that part of the mechanism lying below the plane $X^2$, $X^2$ in Fig. 3, also showing part of the needle frame and needle broken away to show the connection with the shipper-lever regulating the band-conveyer, the elevators and the lower needle shaft. Fig. 3— is a front view of the frame work showing the position of the shafts, the guard rods and the clutch controlling the tucker slide, the grain receptacle being removed. Fig. $3^a$— is a vertical transverse section on the line $X^{18}$, $X^{18}$, Fig. 3, through the tucker crank-shaft showing the position of the trip $m^{12}$ and the lever $m^{11}$. Fig. $3^b$— is a longitudinal vertical section through the axis of the twister on the line $X^3$ $X^3$, Fig. 2. Fig. 4— is a vertical transverse section on the line $X^4$ $X^4$, Fig. 2, through the twister-head. Fig. 5— is a vertical transverse section on the plane $X^5$, $X^5$, Figs. 2 and 3, showing the upper elevator shaft and the guard rods O, also showing the shipper lever controlling the band conveyer and the elevators. Fig. $5^a$— is a vertical longitudinal section in the plane X X Fig. 2. Fig. 6— is a vertical transverse section on the line $X^6$, $X^6$, Figs. 2 and 3 showing the relative positions of the master wheel, the cog wheel $b'$ and the cog pinions $b^2$ and $b^3$. Fig. 7— is a section through the axis of the upper and lower needle shafts in the plane $X^7$ $X^7$, Fig. $5^a$. Fig. $7^a$— is a transverse section through the needle-frame, half-tube band guide, and needle on the line $X^{16}$ $X^{16}$ in Fig. 7. Fig. 8— is an enlarged top view of the complete tucker. Fig. 9— is a bottom view of the tucker. Fig. 10— is a side view of the tucker. Fig. 11— is a vertical transverse section through the tucker on the line $X^{17}$, $X^{17}$, Fig. 8. Fig. 12— is a vertical transverse section through the tucker on the line $X^8$, $X^8$, Fig. 9. Fig. 13— is a horizontal section through the tucker head on the line $X^9$, $X^9$, Fig. 11. Figs. 14, 15 and 16— show on an enlarged scale details of mechanism for throwing into and out of gear the shaft operating the band carrier. Fig. 14 is a top view, Fig. 15 a vertical transverse section through the shaft $M^2$ and the yoke $M'$ on the line $X^{10}$, $X^{10}$, Fig. 14, and Fig. 16 a horizontal section through the yoke $M'$ on the line $X^{11}$ $X^{11}$ Fig. 15. Fig. 17— is an enlarged view of the tucker bar and the knife in their respective guides and the slide and the crank-shaft operating the same. Fig. 18 is a vertical transverse section on the line $X^{21}$ Fig. 17. Figs. 19, 20, $20^a$ and 21 are enlarged views of the mechanism for throwing the elevators into and out of gear. Fig. 19 is a vertical transverse section through the standard $h^9$ and the shaft $h'$ on the line $X^{14}$, $X^{14}$ in Fig. 20. Fig. 20 is a side view of the mechanism for throwing the elevators into and out of gear. Fig. $20^a$ is a detached view of the forked shipper-lever $h^4$. Fig. 21 is a top view of the mechanism for throwing the elevators into and out of gear. Fig. 22— is a transverse section through the tucker slide on the line $X^{12}$ $X^{12}$ in Fig. 17. Fig. 23— is a transverse section through the tucker-guide on the line $X^{13}$, $X^{13}$ in Fig. 17. Fig. 24— is an enlarged view showing the tucker and knife in position on the needle-frame also showing the half tube band guide on the back of the needle-frame; also showing the mechanism for shifting laterally the needle-frame and connected parts. Fig. 25— shows on an enlarged scale the divider mechanism in place under the needle point. Fig. 26— is a side view, enlarged, of the divider mechanism. Fig. 27— is a transverse section on the line $X^{15}$, $X^{15}$ in Fig. 26. Fig. 28— is an enlarged view of the divider fork $C^{21}$. Fig. 29— is an enlarged detached view showing the position of the sprocket-wheels on the upper elevator shafts. Fig. 30— is an enlarged detached view showing a part of the lower needle shaft $H^5$, the tube $C^4$, and the double cog pinion on the tube, and the clutch on the shaft, also showing the forked lever operating the clutch. Fig. 31— is an enlarged partial section through the needle frame on the line $X^{19}$ $X^{19}$ of Fig. 24 showing the wedges $C^{13}$. Fig. 32— is an enlarged developed plan of the concave surface of the needle showing the needle jaws and the cams on the needle. Fig. 33— is an enlarged transverse section through the needle frame and the needle on the line $X^{20}$ $X^{20}$, Fig. 31. Fig. 34 is a bottom view of the machine. Figs. 35, 36 and 37 are vertical transverse sections through the twister head on the lines 2—2, 3—3 and 1—1 respectively of Fig. 41. Fig. 38— is an enlarged detached sectional view of the shield under the twister, and shows it telescoping into the half tube band-guide which runs up behind the needle frame. Fig. 39— is an enlarged detached view of the twister head. Fig. 40— is an enlarged longitudinal section through the twister tube, the twister frame, the twister head and the shield $d^9$, and shows the relative position of the several parts. Fig. 41— is an enlarged longitudinal section through the twister frame, and shows the shield $d^9$ and the twister head $D^2$ in position thereon. Fig. 42— is an enlarged side elevation of the needle showing the positions of the cams and the needle jaws thereon. Figs. 43, 44, 45, 46, 47, 48 and 49 illustrate the successive stages of the operation of twisting together the ends of the band around the bundle and tucking said twisted ends under the band, and between the band and the bundle.

In each of the figures similar letters refer to the same parts.

For convenience I will describe the various parts of my machine in the following order, viz:—The main frame is rectangular in form and consists of side pieces A and end pieces A′ suitably framed together. Near one end is a cross piece $A^2$. At the center of the end piece A′ and the cross piece $A^2$ are suitable bearings for the axle $b$ of the master wheel B. To the top of the side pieces A are secured the standards $a$ supporting in suitable bearings at their upper ends the shafts $h$, $h'$ which lie within the tubular shaft H—H′. Under one end of the frame is the caster wheel $A^4$ supporting part of the weight of the frame. Curved grain receptacles $A^3$ are provided to receive the cut grain from the platform conveyer of the harvester. These receptacles have their upper ends turned around and supported on the tubular shaft H. Their lower ends are preferably turned around and supported on the twister tube D′ as shown in Fig. 1, but other suitable means which will support the lower ends of the receptacles in such position that the concave surface of the receptacles will approximately conform to the concave surface of the needle frame may be used. Secured to the cross piece A′ are the curved guard rods O, which serve to guide the bundle to the ground after it leaves the elevator. The upper end of one of the guard rods is attached to and supports the standard $h^9$. The upper ends of the other guard rods inclose the shaft $h'$ and the tubular shaft H′. To the hub of the wheel B is secured the cog wheel $b'$. The cog pinions $b^2$ and $b^3$ are placed relative to and mesh with the cog wheel $b'$ as shown in Figs. 1, 2 and 6. Shafts $b^6$ and $b^7$ connect the cog pinions $b^3$ and $b^2$ with the sprocket wheel $b^4$ and the bevel wheel $b^5$ respectively. The bevel cog wheel $b^5$ meshes with the bevel cog pinion $b^8$ and drives the shaft $h^2$. At the outer end of the shaft $h^2$ is secured the sprocket wheel $S^3$ over which runs the main sprocket chain S, which moves the sprocket wheels S′, $S^2$, $S^7$ and $S^8$, imparting motion to the needle, the elevators, the twister and the various mechanisms connected therewith, as hereinafter described.

*The needle frame, the needle and operating mechanisms.*—The needle frame consists of two parallel segmental guides C having near their upper ends lugs C′ and near their lower ends lugs $C^2$; these lugs have transverse holes through which pass the tubes $C^3$ and $C^4$. The shafts $h$ and $H^5$ when not in gear turn freely within the tubes $C^3$ and $C^4$ respectively. The frame $C^{27}$ is secured to one of the lugs C′ and has at one side an integral collar $C^{30}$, surrounding the shaft $h$, and against which the spring $C^{19}$ bears. The needle guides are supported and held in place on the shafts $h$ and $H^5$ by the lugs C′ and $C^2$ which are securely joined by transverse bars $C^6$. Secured to the tubes $C^3$ and $C^4$ are the double cog pinions $C^5$. These pinions are actuated by the shafts $h$ and $H^5$ revolve in the same direction and mesh in segmental racks on the back of the needle as clearly shown in Figs. $5^a$, 24, and 25, moving the needle in longitudinal channels in the guides C, in a circle always in the same direction as hereinafter explained. The form of the channels $C^{28}$ is clearly shown in Fig. $7^a$. The L shaped portion accommodates the guide flanges on the needle $C^9$ and the more deeply recessed portion accommodates the cams $C^{14}$ and $C^{15}$ and the projecting ends of the jaws $C^{11}$ on the needle. On the inside of the channels $C^{28}$ near their upper end are wedges $C^{13}$ against which the projecting edges of the needle jaws $C^{11}$ impinge to open the jaws and release the band. (See Fig. 31.) Running around and secured to the back of the guide C, is the guard plate $C^7$ and the band-guide $C^8$. That part of the band guide which is in contact with the plate $C^7$ is in the form of a half tube. The remainder of the band guide is tubular in form. The upper and lower ends of the half tube band guide are curved around and fit in the groove around the double cog-pinions $C^5$ as shown in Fig. 7, so that when the needle frame is shifted as hereinafter described the curved ends of the half tube band-guide serve to slide the cog-pinions and the tubes $C^3$ and $C^4$ to which the pinions are secured, on the shafts $h$ and $H^5$. Other suitable means for shifting the tubes $C^3$, $C^4$ and the double cog-pinions $C^5$ with the needle frame may be used; as for example, collars on the tubes $C^3$ $C^4$ one on each side of the lugs C′ and $C^2$ respectively, or the hubs of the cog-pinions $C^5$ may be extended to fill the space between the lugs C′ and $C^2$ and so connect the tubes with the needle frame. Within the band-guide is a barbed belt $C^{26}$ which runs in the groove of the double cog pinions $C^5$ (see Fig. 24) and carries the twisted straw band from the band conveyer up over the upper pinion $C^5$ through the eye of the lever $C^{16}$ into position to be seized by the jaws in the end of the needle and carried around the bundle as hereinafter described. The needle consists of a bifurcated segmental bar $C^9$ a little more than a half circle in length and having the front end pointed, and the rear end open as shown. (See Fig. 32.) On the outer surface of each arm of the needle is a rack $C^{10}$ meshing with the pinions $C^5$. On the front and near the point of the needle are pivoted two jaws $C^{11}$ the points of which are held together by a spring $C^{12}$ so as to clasp the band between the jaws and carry it around the bundle as the needle revolves. There is on one edge of the needle a cam $C^{14}$ which at the proper moment moves the lever $m^6$ to throw the band conveyer and the lower elevator shaft out of gear as hereinafter described. The lever $m^6$ also has a downwardly extending forked arm $m^{17}$ which moves the clutch $h^{17}$ on the lower needle-shaft $H^5$ to throw the needle out of gear, as clearly shown in Fig. 30. On the other edge of the needle is the cam $C^{15}$ which actuates the rod $m^{18}$ which is adjustable on and moves the lever $m^{11}$ to throw the tucker slide and the knife slide into gear. They are thrown out of gear by means of the cam $m^{14}$ engaging with the lever $m^{12}$ as hereinafter explained. The needle is propelled by the double cog pinions $C^5$ the upper one of which is thrown into gear by the band pulling down on the tension lever $C^{16}$ releasing the clutch $C^{18}$ and permitting the spring $C^{19}$ to slide the clutch into gear with the tube $C^3$. This starts the needle and causes the cam $C^{14}$ to pass the lever $m^6$ thus also starting the lower double cog-pinion $C^5$. After the needle has made a complete revolution, the cam $C^{14}$ strikes finger $m^7$ of the lever $m^6$, throws out of gear the band conveyer adjacent to the point of the twister, and the fork $m^{17}$ projecting from the lever $m^6$ at the same instant throws out of gear the lower double cog pinion $C^5$, and the point of the needle having reached the position shown in Fig. 1 relaxes the band; the spring $C^{17}$ reacts to ship the lever $C^{16}$, slides the clutch $C^{18}$ out of contact with the tube $C^3$, and the needle comes to rest at the point from which it started and so remains until the pressure of straw on the band again pulls down the lever $C^{16}$ and starts the needle.

*The twister and connected mechanism.*— The mechanism for twisting the band is shown in detail in Figs. 2, $3^b$, 4 and others. The twister frame D, extends transversely across and is secured at its ends to the main frame A. The twister frame and sill A support in suitable bearings $d^{10}$ the tube D'. At the outer end of the tube D' runs loosely the sprocket wheel $S^8$. This sprocket wheel has one end of its hub formed as a clutch $d^5$ to engage with the collar $d^{15}$ which is secured to and revolves with the tube D'. The sprocket wheel $S^8$ connects by chain S with and receives motion from the sprocket wheel $S^3$ on the main shaft $h^2$. Separating the collar $d^{15}$ and the sprocket wheel $S^8$ is the coiled spring $d^7$. This spring serves to keep the clutch open and the twister out of gear until the straw wound around the end of the twister and seized by the conveyer band $e^2$, as I will hereafter explain pulls on the end of the twister tube thereby compressing the spring $d^7$ and throwing the clutch into gear and it remains so as long as the band continues to pull on the end of the twister tube, and when the "pull" of the band ceases the spring again forces the clutch out of contact. In order to start the twister and make band enough for the band conveyer to take hold of it I employ the shipper lever shown in Fig. 2. This shipper lever consists of a rod $d^{12}$ supported in suitable bearings $d^{11}$ secured to the inside of the main frame A. At one end of the rod $d^{12}$ is a fork $d^{14}$ which stands vertically and spans the tube D' between a collar $d^6$ on the tube and the side A of the main frame. Near the other end of the rod is a treadle $d^{13}$ extending horizontally at right angles to the rod $d^{12}$ within easy reach of the operator so that as the treadle is depressed a rocking movement is imparted to the fork $d^{14}$ and the fork pressing against the collar moves the connected tube D' until the spring $d^7$ is compressed and the clutch is closed. As soon as the pressure is removed from the treadle $d^{13}$, the spring $d^7$ reacts and the clutch is opened. Within the tube D' is the twister shaft $d$. (See Fig. $3^b$.) The outer end of this shaft is threaded and has a thumb-screw $d^8$ by means of which the adjustment of the shaft within the tube may be regulated. Near the front end of the shaft $d$ are pivoted the darts $d^2$. These darts project through slots in the tube D' provided for that purpose, so that as the thumb-screw $d^8$ is tightened, the shaft $d$ recedes and draws in the darts $d^2$; as the thumb-screw is unscrewed the shaft $d$ advances and forces the darts $d^2$ farther out through the slots in the tube D'. The purpose of this adjustment is to regulate the hold of the darts on the straw, thereby regulating the size of the band, since the farther the darts project the more straw they will seize and twist. The twister-head $D^2$ incloses and protects the twister. The guide-plates $d^3$ project laterally from the twister-head $D^2$ and serve to guide the straw into the twister. The guard wires $d'$ serve to prevent too much grain from falling in on and clogging the twister, also to support the straw within reach of the twister so that the projecting darts may seize only enough straw to form a band of the desired size. I prefer guard wires of the form shown, but I do not restrict myself to that precise form since guard wires of greater or less curvature may be used. The shield $d^9$ protects the point of the twister and also prevents the loose straw from falling in on and clogging the conveyer belt $e^2$. This shield $d^9$ is a half tube in form and continues around the pulley E' under the twister and under and parallel to the twister-frame, as shown, and has journaled in its rear end the pulley $e'$. The straight end of the shield $d^9$ is turned to conform to and slides in a corresponding collar on the lower end of the half tube band-guide $C^8$ so as to form a smooth channel through which the twisted band is conveyed. Over the pulleys E', e' and under the roller E³ within the shield d⁹ travels the barbed conveyer belt e². The roller E³ revolves in a direction opposite to that of the pulley E' and assists the belt e² in removing the straw-band from the twister. The guide d⁹ telescopes within the band-conveyer tube C⁸ which runs up and around the back of the needle-guide C. After the band is once formed and brought within reach of the conveyer belt e² (set in motion at the proper instant as hereinafter described), the belt feeds the band away from the twister as fast as twisted and in so doing pulls against the twister so as to keep the twister in gear.

The operation of the twisting mechanism is as follows: The grain being cut and conveyed on to the guide plates $d^3$ (see Figs. 1 and 2) by any suitable means, the twister tube D' is revolved by means of the sprocket wheel $S^8$ connected by chain S with the wheel $S^3$ as before described. As the tube revolves the darts $d^2$ projecting through the tube and between the guard wires $d'$ seize the straw and as the tube revolves the straw is twisted into a rope or band; when enough has been twisted the end of this rope or band comes in contact with and is conveyed by the belt $e^2$ around the pulley E' back through the shield $d^9$ into the half tube band guide $C^8$ where it is seized by the barbed belt $C^{26}$ and carried over the groove in the double cog pinion $C^5$ through the eye of the lever $C^{16}$ and up to the needle $C^9$ as I will hereinafter describe.

*The tucker and its operation.*—I will now describe the tucker, the details of which are shown in Figs. 8, 9, 10, 11, 12, 13, 17, and 18. The tucker slide F' extends laterally and connects with the pitman shaft $m^{10}$ shown in Figs. 1 and 17, so that as the shaft revolves it gives a reciprocating motion to the slide F'. The guide F is secured in an inclined position on the front of the needle guide C as shown in Figs. 1 and 24, so that the slide F' will move freely in a line transverse to the needle and parallel to the shaft. At the end of the slide F' and integral therewith is the circular box $F^2$. Within the box $F^2$ is a stud $f$ having a vertical stem on which is pivoted the barrel $F^3$. On the upper side of the spring barrel and integral therewith is the jaw $f'$. Near the lower edge of the guide F is pivoted the grooved wheel $f^2$. To the periphery of the wheel $f^2$ is secured one end of a chain $f^3$. This chain is coiled around the outside of, and its other end is secured to the spring barrel $F^3$. On the shaft $f^4$ of the wheel $f^2$ is a cog pinion $f^5$ which meshes with a rack $f^6$ on one side of the slide F' so that as the slide moves outward and inward it imparts a rotary motion to the pinion $f^5$ and the connected wheel $f^2$. Within the barrel $F^3$ is a spiral spring $f^7$. One end of this spring is secured to the stud $f$ and its other end is secured to the inner surface of the barrel $F^3$ as shown. To the under side of the guide F is secured the bar $f^8$ in which is pivoted the lower end of the shaft $f^4$. The jaw $f^9$ is held in place on the stud $f$ by means of a screw and washer as shown. One end of the jaw $f^9$ extends rearward and downward as shown in Fig. 10, so as to guide the band up over the tucker jaws when the tucker is withdrawn while the tuck is being made as shown in Fig. 48 as I will hereinafter explain. To the lower end of the jaw $f^9$ is secured one end of a helical spring $f^{10}$ which extends around and has its other end secured to the barrel $F^3$ so that as the projecting front end of the jaws $f'$ is forced open by the band, the spring reacts to close the jaw and hold the band between the jaws as hereinafter described. At the beginning of the operation of forming and tying the bundle, the band which has been previously formed by the twister and conveyed up around the back of the needle guide over the double cog pinion $C^5$ near the end of the guide, extends down in a straight line to the point of the needle, near the lower end of the needle guide, as shown in Fig. 1, the lower end of the band being securely held between the jaws $C^{11}$ in the end of the needle. As the cut grain is carried from the horizontal platform conveyer of the harvester (which is such as is commonly used on harvesters and need not be described here) the straw presses against the band and as it accumulates moves the band toward the needle guide until the pressure is sufficient to pull down the tension lever $C^{16}$ and throw the needle into gear. At this point the band lies behind the straw which is to form the bundle. The needle immediately begins to move in its guides carrying the band around the bundle up toward the tucker as shown in Fig. 43, until the point of the needle reaches the position at which the tucker slide is thrown into gear. For convenience in description I will refer to that end of the band which is carried in the jaws of the needle, as the "needle end," and to the other end as the "tucker end." At the time when the operation of twisting together and tucking the band is to begin the tucker end of the band lies in front of the knife and behind and a little to one side of the point of the tucker; as shown in Fig. 43. At this instant the tucker slide begins to move outward transversely to the needle guide and as it moves the tucker jaws are rotated as heretofore described, until the longer jaw of the tucker engages with the tucker end of the band and the band sliding along the edge of the longer jaw forces open the shorter jaw and enters and is held between the jaws, as shown in Fig. 44. As the tucker slide continues to move outward the rotating jaws of the tucker force the band around until the band reaches the notch $f^{11}$ in the edge of the tucker slide and the rotating jaws continue to pull the tucker end of the band through the notch and around the barrel of the tucker until the tucker has made about two thirds of a revolution. If the straw while being carried around the drum $F^2$ into the notch $f^{11}$, should strike the chain $f^3$ the chain would be pressed toward the notch; this however would not prevent the working of the device. The only effect would be to slightly accelerate the rotation of the barrel $F^3$. The open jaws holding between them the tucker end of the band, lie in the same plane with the needle end of the band, which carried in the point of the needle moves in a circle toward the top of the needle guide. The needle in revolving upward places the needle end of the band in the notch $f^{12}$ and it is drawn tight in the notch by the movement of the needle and remains in the notch in a position to enter the tucker jaws which are already partially opened by the tucker end of the band. At this point the longer jaw of the tucker engages with the needle end of the band until it is also forced between the jaws of the tucker, as shown in Fig. 45. Both ends of the band are now held between the jaws and the jaws in revolving pass under the band and between the band and the box $F^2$ of the tucker, thereby twisting together the ends of the band as shown in Figs. 46, 47, and 48. The tucker slide continues to move outward and the revolving tucker jaws carry the twisted ends of the band over the barrel of the tucker as shown in Fig. 48, thereby tightening the band on the bundle. The notches $f^{11}$, $f^{12}$ in the slide are an essential part of the mechanism which performs the triple function of tightening the band, twisting together and tucking the ends of the band; so also is the curved arm of the jaw $f^9$ necessary to guide the band over the barrel as the slide retreats in making the tuck, as shown in Fig. 48. At that stage of the operation at which the tucker jaws have completed about four fifths of their first rotation the point of the needle has entered the upper end of the needle guide and the jaws $C^{11}$ on the end of the needle engage with the cams $C^{13}$ in the needle guide to open the jaws of the needle to receive the needle end of the next band. Simultaneously the needle end of the band just formed and which surrounds the bundle is released. Here it should be observed that the knife G moves simultaneously with and parallel to the tucker slide. At the time that the point of the needle begins to move upward from the lower end of the needle frame, the twisted band extends in an approximately straight line from the upper double cog-pinion $C^5$ down to the jaws of the needle and there is room behind the upper end of the band for the knife to pass between the band and the needle-guide. The upper edge of the knife is the cutting edge and when the knife has passed under the band and between the band and the needle guide as described, the tucker end of the band lies against the edge of the knife. When in the revolution of the needle the point of the needle has entered the upper end of the needle guide $l$ the needle jaws having grasped the tucker end of the band press the band against the knife and the band is cut off below the point where the jaws seized it and the needle as it revolves carries the band around to form the tie for another bundle. After the band is cut off the jaws continue to move, making one or more complete turns thereby twisting together the ends of the band as clearly shown in Fig. 48. The number of turns made by the jaws controls the number of twists made in the band and a greater or less number of turns may be made depending upon the distance traversed by the slide $F'$ and the number of turns of the chain $f^3$ around the barrel $F^3$. As soon as the ends of the band are twisted together and tucked as above described the tucker slide and knife simultaneously begin to withdraw to their first position. At this stage of the operation the tucker lies under the band and between the band and the bundle, and both ends of the band are held between the jaws of the tucker. As the tucker slide withdraws, the band slips over the tucker and the ends held by the tucker are drawn under the band as shown in Fig. 49, and as the tucker slide continues to withdraw it pulls the ends of the band from the jaws of the tucker and the binding of the bundle is then complete. The jaws seize both ends of the band above the bundle, and in revolving twist the ends above the bundle and on top of the tucker box $F^2$ and in withdrawing, tuck the twisted ends between the bundle and the band in the same direction as the withdrawal motion of the tucker, in contradistinction to tuckers of that class in which the tuck is made as the tucker moves outward and is liable to be pulled out by the withdrawal movement of the tucker.

I am aware that a twister has been used to twist together the ends of a band around a bundle, so has a compresser been used to tighten the band, a tucker to tuck the twisted ends under the band, each of these functions being performed by a separate mechanism, and a co-operation of all the mechanism being necessary to complete the tightening, the twisting together of the ends, and the tucking. I accomplish all these results in a superior manner, by one mechanism; viz, the tucker, which I have described.

The mechanism for starting and stopping the tucker and knife slide which I will now describe, is clearly shown in Figs. 1, 2, 3, and $3^a$. The shaft $m^{10}$ supported in suitable bearings on the standards $a$ has near one end a sprocket wheel $S^9$, running loose on the shaft and connected by a sprocket chain $S^{10}$, with the sprocket wheel $b^4$, as shown in Figs. 1 and 34. The hub of the wheel $S^9$ is notched to engage with the clutch sleeve $M^3$, sliding on the shaft $m^{10}$. Integral with the clutch sleeve $M^3$, is a circumferential wedge or cam $m^{14}$. To the outer end of the shaft $m^{10}$, is secured a crank $m^{22}$, connected by the rod $g^4$, with the knife and tucker slide $G'$ as already described. Secured to the standard $a$ is a forked spring $m^{13}$, which straddles the shaft $m^{10}$ and presses against the end of the clutch sleeve $M^3$, the longer fork of the spring $m^{13}$ extends do ward and presses against the lower arm of the tripping lever $m^{12}$ which is fulcrumed on the block $m^{16}$, secured to the standard $a$ and holds the upper end of the lever in contact with the periphery of the clutch collar $M^3$ so that as the clutch collar revolves when engaged with the hub of the wheel $S^9$, the wedge $m^{14}$, engages with the end of the lever $m^{12}$; this lever does not have lateral movement, but the clutch collar slides on the shaft. Hence when the wedge is in contact with the lever the clutch collar $M^3$ slides on the shaft and disengages the clutch while such contact lasts. As soon as the lever is disengaged the spring $m^{13}$, reacts to close the clutch. The lever $m^{11}$, which has a projecting finger $m^{15}$, has its fulcrum $m^{19}$ on the main frame and is moved by the rod $m^{18}$ which is adjustably connected with said lever and one end of which enters an opening in the needle frame and engages with the cam $C^{15}$, on the edge of the needle.

In operation, when in the revolution of the needle the cam $C^{15}$, engages with the end of the rod $m^{18}$, the rod is pushed outward and moves the lever $m^{11}$, on its fulcrum so as to cause the finger $m^{15}$, to press against the upper end of the lever $m^{12}$ disengaging the lever from the wedge $m^{14}$, and permitting the clutch sleeve $M^3$, to engage with the notched hub of the sprocket wheel $S^9$, thereby bringing into action the shaft $m^{10}$, which continues to revolve until the wedge $m^{14}$, again coming around engages with the end of the lever $m^{12}$ (which by this time has by the pressure of the spring $m^{13}$, been returned to its first position), and slides the clutch collar to disengage the clutch and stop the shaft. The position of the wedge $m^{14}$, on the clutch collar $M^3$, is such that the shaft comes to rest when the crank $m^{22}$, completes its full inward throw as shown in Figs. 1 and 17. As soon as the band ends are withdrawn from the jaws of the tucker, as shown in Fig. 49 the tucker jaws actuated by the spring within the barrel move back to their first position as shown in Fig. 43 in readiness to begin tying another bundle.

*The knife and connected parts.*—The details of the knife are clearly shown in Figs. 17, 18, 22 and 23. Both prongs $g$, $g^2$ of the slide $G'$ are connected with the knife blade G and the slide $F'$ by means of the pin $g^8$ which forms the pivot on which both prongs turn. The knife blade moves in the upper channel $g^6$ and the tucker slide moves in the lower channel $g^7$ of the guide F. The slide $G'$ slides on the rod $g^4$ so as to adjust the length of the knife-connection to the position of the needle-frame as the needle-frame is shifted as hereinafter explained, and is secured in place by the clamping screw $g^3$.

The operation of the knife and the tucker-slide is as follows: By means of mechanism hereinafter described the needle at the proper instant throws into gear the sprocket-wheel $b^4$, and the chain $S^{10}$ moving in the direction indicated by the arrow revolves the sprocket-wheel $S^9$ and by means of the crank-shaft $m^{10}$ imparts a reciprocating motion to the slide $G'$ the connected blade G and the tucker-slide $F'$ so that the blade G and the tucker-slide $F'$ at one end of the stroke will occupy the position shown in Fig. 17 and at the other end of the stroke will occupy the position indicated by dotted lines in the same figure, and will lie across the central opening in the needle-guide. In other words the knife is at one end of the throw in position to cut off the band, and at the other end of the throw is withdrawn out of the way of the band. In operation when the knife rests at the outward limit of the throw the band is cut by being pressed by the needle against the upper edge of the knife. After the band is cut the knife is withdrawn, a new band is carried down, and the knife is moved outward in position to cut the new band.

*The elevator and connected mechanism.*— The elevators consist of parallel sprocket-chains $H^3$ having forked conveyers $H^4$ as shown in Fig. 1, and running over the sprocket-wheels $h^{16}$ $h^8$ and $h^{13}$ on the tubular shafts H H' and $H^2$. The tubular shafts H turn freely on the shaft $h$. Within the tubular shafts H H' and $H^2$ are shafts $h$ $h'$ and $h^2$ to which are secured the sprocket-wheels $S'$ $S^2$ and $S^3$ revolving in the direction indicated by the arrows $y^6$ $y^7$ $y^5$ respectively. In order that the elevator chains $H^3$ may run alternately up and down as described, it is necessary for the shaft $h'$ to revolve in a direction contrary to that of the shaft $h^2$. This I accomplish by placing on the shafts $h$ and $h'$ other sprocket-wheels $S^4$ and $S^5$ respectively as clearly shown in Figs. 1 and 29. The sprocket-wheel $S^2$ runs loose on the shaft. The other sprocket wheels are secured to the shafts. The sprocket-chain $S^6$ connects the sprocket-wheels $S^4$ and $S^5$. The sprocket-chain S revolves the sprocket-wheel $S'$ in the direction indicated by arrow, and the sprocket wheel $S^4$ also secured to the shaft $h$ revolves in the same direction and by means of the chain $S^6$ turns in the same direction sprocket-wheel $S^5$ and the shaft $h'$ to which it is secured. The sprocket-wheel $S^2$ is an idler and serves only to keep the sprocket-chain S in line. The elevators are set in motion by a trip connected with the needle as I will hereinafter explain; they begin to move upward simultaneously with the needle, and assist the needle in compressing the grain into a bundle and bringing it up in position to make the tuck. As soon as the bundle is formed and tucked the elevators continuing to move upward carry the bundle up over the machine and deposit it on the guards O whence it falls to the ground. To start the elevators at the proper moment to run up and carry the bundle over the machine and upon the rods O, I employ the mechanism which I will now describe. (See Figs. 2 and 5$^a$.) Connected to the rod $m'$ is the projecting forked arm $m^3$ the fork of which spans the clutch $h^{14}$ sliding on the shaft $h^2$; under the lever $m^6$ is a spring $m^9$ which reacts to move the lever. When the needle is at rest the point of the lever $m^6$ rests on top of the cam $C^{14}$. When the needle begins to move the cam $C^{14}$ slides from under the point of the lever $m^6$ permitting the spring $m^9$ to react to throw the lever and by means of the connecting rod $m'$ and arm $m^8$ slide the clutch $h^{14}$ into contact with the shaft of the sprocket-wheels $h^{13}$ which run the elevator chains upward until their motion is reversed by the means which I will now describe: To reverse the motion of the elevators a pin $h^{12}$ on the sprocket chain $H^3$ (see Fig. 1) projects sidewise and when the pin reaches the top of the sprocket-wheel on the tubular shaft $H'$ it strikes a trip $h^3$ which moves a clutch, as I will hereinafter explain, throws the sprocket wheels on the upper shaft $H'$ into gear and reverses the motion of the sprocket wheels $h^8$. The mechanism for reversing the motion of the elevators is shown in Figs. 19, 20, 20$^a$ and 21. The clutch $h^5$ slides on the shaft $h'$ and has on its inside a feather which slides in a corresponding groove in the shaft $h'$ so that the clutch revolves with the shaft. When not in gear the shaft $h'$ revolves freely within the tube $H'$. The fork $h^4$ is fulcrumed in the standard $h^9$ as shown and its upper end projects through the slot in the trip $h^3$ so that as the trip turns in the direction shown by arrow it imparts motion to the forked lever $h^4$ to close the clutch and throw the sprocket wheel $h^8$ into gear. The pin $h^{12}$ moving upward does not entirely pass the finger of the trip $h^3$ but moves the trip sufficiently to close the clutch and leave the finger of the trip $h^3$ in position to be engaged by the pin $h^{15}$ as the chain runs down. At the same instant that the wheel $h^8$ comes into action the lug $C^{14}$ near the point of the needle moves the lever $m^6$ which by means of the projecting arm $m^8$ slides the clutch $h^{14}$ on the shaft $h^2$ to throw the sprocket wheels $h^{13}$ out of gear and permit the elevators to run back to their first position. As soon as the elevators have reached this position the other pin $h^{15}$ on the elevator chain $H^3$ strikes the projecting finger of the trip $h^3$ causing it to turn so as to open the clutch and throw the elevator out of gear. The elevators then stop and remain at rest until again thrown into gear as before described.

*Mechanism for throwing the band-conveyer, the tucker and the knife into and out of gear.—* I will now describe the mechanism for throwing the band-conveyer into and out of gear. (See Figs. 14, 15 and 16.) A sprocket wheel M driven by chain $s^{10}$ from the wheel $b^4$ rotates in the direction indicated by arrow. The sprocket wheel M has a long hub and in the hub there is a circumferential groove $m^5$ and the end of the hub is notched so as to engage with the clutch $m^4$ which is secured to the shaft $M^2$. The shaft $M^2$ runs parallel to the front piece of the main frame A and its ends are journaled:—one end in the cross bar $A^2$ of the main frame and the other in a bracket projecting from the front piece of the main frame A. A yoke $M'$ surrounds the hub and slides in the groove $m^5$. Within and integral with the yoke are two wedges $m^3$ clearly shown in Fig. 16 which impinge against the conical surface $m^5$ of the hub. At each end of the yoke is a projecting rod $m'$. One of these rods extends back through the guides $m^{20}$, and is pivotally and adjustably connected in any suitable manner with the lever $m^6$ (see Fig. 2) having its fulcrum $m^{21}$ on a lug projecting from the needle guide C; the other end slides in a suitable guide in the front piece of the main frame A so that the yoke must move in a straight line transverse to the shaft $M^2$. Between the hub of the sprocket wheel M and the cross bar $A^2$ of the main frame is a spring $m^2$ coiled around the shaft $M^2$. The operation of this mechanism is as follows: Assume the needle to be moving within the guide as indicated by arrow in Fig. 2. When the cam on the edge of the needle reaches the position shown, the finger $m^7$ would be on top of the cam, the lever $m^6$ the yoke $M'$ and the sprocket-wheel M would be in the respective positions shown, the spring $m^2$ would be compressed and the clutch would be open. The needle moving in the direction indicated withdraws the cam from under the finger $m^7$ and releases the lever $m^6$ so that the spring $m^9$ reacting draws back the yoke to the position shown in dotted lines,—Fig. 15,—so that the spring $m^2$ reacts to slide the sprocket-wheel M on the shaft and close the clutch and the clutch remains closed and the shaft in gear until the cam on the needle again comes around and moves the lever and yoke to open the clutch as shown.

*The shifting mechanism.—*The mechanism for shifting the needle-frame and connected parts, is clearly shown in Fig. 24; the purpose of this mechanism is to move the needle-frame, toward or away from the twister as may be necessary to adjust it to grain of different lengths. In short grain the needle is placed near the twister-head, and in longer grain is moved farther away. An arched standard N is secured to the upper side of the cross-piece $A^2$ and to the side of the cross-piece is pivoted a lever $N'$ carrying a latch $N^4$ which drops into the notches in the standard to hold the lever at different angles; this latch is operated by a hand-lever $N^3$ in a manner well known; to the lever $N'$ is pivoted the rod $N^2$ which is suitably connected with the back of the needle-frame, so that as the lever $N'$ is moved in one direction it will pull the needle-frame and connected parts in that direction, and when the lever is moved in the opposite direction it will push back the needle-frame and connected parts.

The details of the divider are shown on an enlarged scale in Figs. 25, 26, 27 and 28.

The purpose of the divider mechanism is to separate that part of the grain which is to form the bundle from the other grain which accumulates on the binder platform.

To the vertical lug $C^2$ on the under side of the needle frame is secured the horizontal guide $C^{20}$; surrounding and journaled on the tubular twister shaft $D'$ is the slotted bell-crank lever $C^{22}$ having in the end of its upper arm the rollette $C^{24}$. Pivoted to the lug $C^2$ is the arm $C^{23}$ extending horizontally parallel to the horizontal arm of the bell-crank. Standing vertically within the opening in the guide $C^{20}$ is the divider fork $C^{21}$ clearly shown in Fig. 28. When this fork is raised to divide the grain one tine of the fork stands on each side of the needle. The fork is pivoted at the outer end of the arm $C^{23}$ on a pin which extends through and works in the slot in the bell crank arm. On the under side of the needle $C^9$ is a cam $C^{25}$ which as the needle revolves engages with the rollette $C^{24}$.

The operation of the divider is as follows: Assume the needle to be at rest in the position shown in Fig. 25. When the needle $C^9$ actuated by the cog-pinion $C^5$ begins to move the cam $C^{25}$ engages with the rollette $C^{24}$ and presses down the vertical arm of the bell-crank $C^{22}$ causing the horizontal arm of the bell crank to rise and it raises the arm $C^{23}$ and the connected fork $C^{21}$ as shown by dotted lines in Fig. 26, and the fork remains raised as long as the rollette $C^{24}$ is in contact with the needle. When the needle passes and releases the lever $C^{22}$, the levers and the fork gravitate to their normal poition.

The operation of my machine is as follows: The cut grain is carried by the platform-conveyer of the harvester—in a manner well known—to the grain receptacle $A^3$. From the grain deposited on the receptacle $A^3$ the twister (thrown into gear by pressing with the foot on the treadle $d^{13}$) begins to turn and the projecting darts $d^2$ seize a sufficient quantity of straw and begin to twist it into a band. The end of the twisted band passes between the roller $E^3$ and the pulley $E'$ and as they revolve they carry the band forward and pulling on the band hold the twister in gear and the twisting of the band continues as heretofore described. As soon as the end of the twisted band passes between the pulley $E'$ and the roller, the band is seized by the barbed belt $e^2$ and carried down through the shield $d^9$ to a position under the lower end of the needle frame whence it is guided into the lower end of the half tube band guide $c^8$, behind the needle-frame where it is seized by the barbed belt $C^{26}$ (Fig. 25) within the band guide and carried up behind the needle frame through the groove in the upper cog pinion $C^5$ through the eye of the tension-lever $C^{16}$ and through the opening between the needle guides. The belt $C^{26}$ runs around the grooved portion of both the upper and lower pinion $C^5$. The end of the band now projects through the upper end of the opening between the needle guides. To start the needle for the first time and enable the needle jaws to catch the projecting end of the band, the operator presses down on the lever $C^{16}$ and throws the needle into gear.

The needle now revolves upward, seizes the end of the band and draws the band down. This is only done at starting. After the needle is once threaded it continues to operate automatically, until the needle rests with its point near the lower end of the needle-frame as shown in Fig. 2 and the band extends between the forks of the needle in a straight line from the eye of the needle to the eye of the lever $C^{16}$. As the grain accumulates on the binder platform $A^3$ it presses against the band causing the band to pull down the lever $C^{16}$ and throw the needle into gear. As soon as the needle begins to move the cam $C^{25}$ on the under side of the needle presses down the lever $C^{22}$ which raises the divider fork $C^{21}$ and separates from the other grain on the platform the grain which is to form the bundle; the needle having the end of the band between its jaws continuing to move carries the band around the bundle and brings the band in position to be seized by the tucker; at this instant the cam $C^{15}$ on the needle moves the rod $m^{18}$ actuating the lever $m^{11}$ and throws the tucker into gear. As the tucker withdraws, the knife also withdraws and both return to their first positions. The elevator actuated by the shaft $h^2$ moves in unison with the needle and the elevator-forks $H^4$ carry the bundle up to be tucked, and when the band is cut and tucked they carry the bundle up over the machine and deposit it on the guard rods $O$, whence it falls to the ground. At the same instant that the elevators deposit the bound bundle on the guard rods $O$ the cam $C^{14}$ engages with the finger $m^7$ moves the lever $m^6$ and the connected arm $m^8$ to disengage the clutch $h^{14}$ and permit the elevators to run backward. The same movement of the lever $m^6$ shifts the forked arm $m^{17}$ and disengages the clutch $h^{17}$ thereby stopping the needle and the needle remains at rest until the pressure of grain on the band pulls down the lever $C^{16}$ and again starts the needle. Simultaneously with the stopping of the needle the pin $h^{12}$ on the elevator chain strikes the trip $h^3$ reverses the motion of the elevators and starts them to running back and they continue to run back until the other finger on the chain strikes the trip to throw the elevator shaft out of gear, and it remains so until the needle again begins to move and withdraws the lug $C^{14}$ from under the finger $m^7$ of the lever $m^6$ permitting the spring $m^9$ to react moving the lever $m^6$ and the connected arms $m^8$ and $m^{17}$ so as to close the clutches $h^{14}$ and $h^{17}$ respectively and so on continuously.

I do not claim broadly the use of a lever operated by pressure of the grain on the band to engage the mechanism driving the needle, but restrict myself to the combination of parts which co-operate to form and hold the band and at proper intervals start the needle.

What I claim as new, and desire to secure by Letters Patent, is—

1. In a straw binder for harvesters the curved grain receptacles, in combination with the rectangular main frame, the standards secured to the main frame, the transverse shaft on the standards supporting the upper ends of the receptacles, and the tubular twister shaft supporting the lower ends of the receptacles, substantially as shown and described and for the purpose stated.

2. A needle for harvester binders consisting of a bifurcated segmental bar having on its back a rack into which meshes a cog-pinion to drive the needle, and having at its point jaws to seize and hold the band, substantially as shown and described and for the purpose stated.

3. A needle frame for straw binding harvesters consisting of two parallel segmental guides having channels within which the needle moves, having a clear space between said guides which the band traverses and having lugs at its upper and lower ends joined by transverse bars substantially as set forth and for the purpose stated.

4. In a straw-binder for harvesters the combination of the bifurcated segmental needle with the parallel needle guides supported movably on horizontal transverse shafts, substantially as shown and described and for the purpose stated.

5. In a straw-binder for harvesters the bifurcated segmental needle having tongues as shown in combination with parallel segmental guides having corresponding grooves in which the tongues slide, substantially as shown and described and for the purpose stated.

6. In a straw-binder for harvesters the bifurcated segmental needle provided with racks on its periphery driven by cog-pinions on the needle shafts and moving always in the same direction, in combination with a needle frame having parallel segmental guides provided with channels in which the needle moves and between said guides a clear space which the band traverses substantially as set forth and for the purpose stated.

7. A band twister for straw binding harvesters, consisting of a tube inclosing a longitudinally adjustable shaft, said shaft having darts projecting through openings in the tube and said tube having at one end a clutch collar engaging with a clutch on the driving wheel, substantially as shown and described and for the purpose stated.

8. In a band-twister for straw-binding harvesters, the combination of the horizontal tube D' having at one end the clutch $d^5$, the shaft $d$ within the tube having near its front end the darts $d^2$ and at its rear end the thumb-screw $d^8$; the sprocket-wheel $S^8$ on the tube D' the supporting frame D and the twister-head $D^2$ having guide-plates $d^3$ guard-wires $d'$ and at one end an opening through which the band conveyer passes, substantially as shown and described and for the purpose stated.

9. A band conveyer for straw-binding harvesters, consisting of two half-tubes, one extending from the point of the twister under and parallel to the twister shaft having within it an endless barbed belt running over pulleys within said tube as shown, and telescoping at one end within another similar half tube extending upward around the back of the needle frame, and having within it an endless barbed belt running over pulleys at each end of said tube, substantially as shown and described and for the purpose stated.

10. In a band conveyer for straw-binding harvesters, the combination of the horizontal half tube $d^9$, the inclosed pulleys E' and $e'$ the barbed belt $e^2$ the roller $E^3$ the half tube $C^8$ inclosing the barbed belt $C^{26}$ running in the grooves of the double cog-pinions $C^5$ substantially as shown and described and for the purpose stated.

11. The combination in a straw-binding harvester of the bifurcated needle moving between the needle guides, the band conveyer extending under the twister and up behind the needle frame and the twister adjacent to the lower end of the needle frame, substantially as shown and described and for the purpose stated.

12. In a straw-binding harvester, the main frame and the standards secured thereon supporting parallel needle shafts, and the needle frame adjustable on said shafts in combination with curved grain receptacle supported in a position parallel to the needle frame, and elevators running over the upper needle shaft and adapted to convey the bound bundle away from said receptacles, substantially as and for the purpose set forth.

13. In a straw-binding harvester the combination of the main-frame the curved receptacles, the adjustable needle frame, the twister frame, the twister and the band conveyer underlying the twister and extending up behind the needle-frame, substantially as shown and described and for the purpose stated.

14. In a straw-binding harvester, the side-piece A the rod $d^{12}$ the bearings $d^{11}$ the treadle $d^{13}$ and the fork $d^{14}$ in combination with the tubular shaft D' the clutch thereon and the inclosed twister-shaft $d$, substantially as shown and described and for the purpose stated.

15. In a straw-binding harvester the combination of the main-frame the transverse twister frame the tubular shaft, the twister shaft, the clutch on the tubular shaft, the shipper lever, the curved grain receptacles the segmental needle guides, the bifurcated segmental needle, and the elevators, substantially as shown and described and for the purpose stated.

16. In a straw-binding harvester the elevators consisting of two parallel endless chains one on each side of the needle frame having forks and driven alternately up and down by sprocket wheels on the lower elevator shaft, and upper elevator shaft respectively, running over sprocket-wheels on the upper needle shaft, and co-operating with a segmental needle revolving in a segmental needle frame, substantially as shown and described and for the purpose stated.

17. In a straw-binding harvester the combination of the main-frame the standards $a$ the horizontal transverse shafts, $h$, $h'$, $H^5$, the tubes H, H', $H^2$, the sprocket-wheels $h^8$ the sprocket-chains $H^3$ the forks $H^4$, the standard $h^9$, the trip $h^3$, the pins $h^{12}$, $h^{15}$, the forked lever $h^4$ and the sliding clutch $h^5$ substantially as shown and described and for the purpose stated.

18. In a straw-binding harvester the shafts $h$, $h'$, $H^5$, the tubes H, H', $H^2$, the sprocket-wheels $h^8$ and the sprocket-chains $H^3$ in combination with the needle $C^9$ the cam $C^{14}$ the lever $m^6$ the rod $m'$ the fork $m^8$ and the sliding clutch $h^{14}$ substantially as shown and described and for the purpose stated.

19. In a straw-binding harvester the endless elevator chains having forks and running over sprocket-wheels on the upper elevator shaft and the upper needle shaft respectively, and driven by sprocket wheels on the lower elevator shaft, the standard, the trip and the clutch on the upper elevator shaft, the pins on the elevator chains, the clutch on the lower elevator shaft, the slide moving the clutch and the lever engaging with the needle to move the slide; in combination with the main frame, the needle frame, the needle, the twister and the band conveyer; substantially as shown and described and for the purpose stated.

20. In a straw-binding harvester the combination of the main-frame, the segmental needle frame, the bifurcated needle, the twister frame supporting in suitable bearings a twister tube, the twister shaft longitudinally adjustable within the tube and having projecting darts, the band conveyer under the twister, the half tube band guide on the needle frame, the elevator, the reciprocating tucker having jaws, and the reciprocating knife, substantially as shown and described and for the purpose stated.

21. A tucker for straw-binding harvesters consisting of a suitable guide within which moves a slide having at one end a box and within the box a suitably supported spring-barrel inclosing a spring and coiled around the barrel a band or chain having its outer end secured in any suitable manner so that as the slide pushes out the band unwinding rotates the barrel in one direction and when the slide pulls back the spring within the barrel re-acts and rotates the barrel in the opposite direction; also having on the barrel jaws held in contact by a spring substantially as shown and described and for the purpose stated.

22. In a tucker for straw-binding harvesters the combination of the guide F the slide F' the box $F^2$ the barrel $F^3$ the spring $f^7$ within the barrel, the stud $f$, the jaws $f'$, $f^9$ the spring $f^{10}$ compressing the jaws, the chain $f^3$ the grooved wheel $f^2$ the bar $f^8$ the shaft $f^4$ the cog-pinion $f^5$ and the rack $f^6$ substantially as shown and described and for the purpose stated.

23. In a straw-binding harvester, the tightening end-twisting and tucking mechanism consisting of a reciprocating slide working in a guide said slide having near its outer end a rotating barrel and near said barrel notches one in each edge of said slide, also having jaws which rotate in one direction as the slide moves outward and rotate in the opposite direction as the slide is withdrawn and one of said jaws having a downwardly curved arm, said notched slide, guide rotating jaws rotating barrel and curved arm co-operating substantially as shown and described and for the purpose stated.

24. In a straw-binding harvester, the tucking mechanism in combination with the needle $C^9$ the lug $C^{15}$ on the needle, the rod $m^{18}$ the standard $a$ the lever $m^{11}$, the trip $m^{12}$ the cam $m^{14}$, the spring $m^{13}$, the clutch $M^3$, the crank-shaft $m^{10}$, and the sprocket-wheel $S^9$ substantially as shown and described and for the purpose stated.

25. In a straw-binding harvester a tucker carried on a reciprocating slide connected with a crank shaft supported on the main frame, moving transversely to, and timed to co-operate with the needle, set in motion by a trip operated by the needle, and automatically stopped at the end of the return stroke of the slide by means of shifting mechanism on the crank shaft, in combination with the main frame, the supporting wheels the needle frame, the needle, the mechanism actuating the needle and the mechanism actuating the crank shaft, substantially as shown and described and for the purpose stated.

26. In a straw binding harvester, the knife carried on a reciprocating slide connected with a crank shaft supported on the main frame, moving transversely to and timed to co-operate with the needle, set in action by a trip operated by the needle and automatically stopped at the end of the return stroke of the slide by means of shifting mechanism on the crank shaft, in combination with; the main frame, the supporting wheels, the needle frame, the needle, the mechanism actuating the needle, and the mechanism actuating the crank shaft, substantially as shown and described and for the purpose stated.

27. In a straw binding harvester the combination of the intermittently rotating crank shaft $m^{10}$, the connecting rod $g^4$, the forked slide G', adjustable on the connecting rod and pivotally connected with the knife G, the tucker slide F', pivotally connected with the slide G', and having at its outer end, rotating jaws, and the guide supporting the knife and the tucker slide, substantially as shown and described and for the purpose stated.

28. In a straw-binding harvester the combination of the needle frame C the needle $C^9$, the lug $C^{14}$, on the needle, the lever $m^6$, the rod $m'$, the forks $m^8$ and $m^{17}$, the spring $m^9$ and the clutches $h^{17}$ and $h^{14}$ substantially as shown and described and for the purpose stated.

29. In a straw-binding harvester the combination of the needle frame C, the needle $C^9$ the lug $C^{14}$ on the needle, the lever $m^6$ the rod $m'$, the forks $m^8$, and $m^{17}$, the spring $m^9$ the clutches $h^{17}$, $h^{14}$, $m^4$, the yoke M' and the spring $m^2$, substantially as shown and described and for the purpose stated.

30. In a straw-binding harvester the combination of the main frame, the needle frame the curved grain receptacles supported in a position parallel to the needle frame, the guard rods secured at their lower ends to the main frame and inclosing in their upper ends the upper elevator shaft, the lower elevator shaft supported in bearings on the main frame, the upper needle shaft having loose sprocket wheels over which the elevator chains run said chains having an alternating up and down movement and being alternately driven by said lower elevator shaft and upper elevator shaft respectively, the mechanism for alternately and automatically engaging and disengaging said shafts, and the mechanism actuating said shafts as set forth and for the purpose stated.

31. In a straw-binding harvester the combination of the needle frame C the lugs $C^2$ on the needle frame, the needle $C^9$ the cam $C^{25}$ on the needle, the slotted bell crank lever $C^{22}$, the lever $C^{23}$, the guide $C^{20}$ and the fork $C^{21}$ all co-operating substantially as shown and described and for the purpose stated.

32. In a straw-binding harvester the combination of the needle driven by cog-pinions on the upper and lower needle shafts moving always in the same direction and having at its point jaws to hold the band the mechanism for twisting the band, the mechanism for conveying the twisted band to the needle, the lever supported on the needle frame and adapted to operate by downward pressure of the straw band, the spring acting against said lever, the clutch member with which said lever engages sliding on the upper needle shaft and acted against by a spring and the tube on said shaft with which said clutch member engages as set forth and for the purpose stated.

33. In a straw-binding harvester the combination of the main frame the parallel needle shafts supported thereon, the needle frame supported by lugs and sliding on the needle shafts, the bifurcated needle moving in the needle frame the adjustable tucker and knife slide and the shifting lever fulcrumed on the main frame and connected with the needle frame, substantially as set forth and for the purpose stated.

34. In a straw-binding harvester, the combination of the main-frame, the supporting wheels, the lower elevator shaft the lower needle shaft the band-conveyer shaft and the twister tube suitably supported on the main frame; the standards secured to the main frame; the upper elevator shaft, the upper needle shaft, and the tucker crank shaft supported in suitable bearings on the standards; the gear wheels connecting the lower elevator shaft with the drive wheel; the sprocket wheels and chains connecting the lower elevator shaft with the lower needle shaft, the upper elevator-shaft the upper needle-shaft and the twister tube; the forks and fingers on the elevator chains; the sprocket wheels and chain connecting the upper elevator shaft with the upper needle shaft; the gear wheels sprocket wheels and chain connecting the drive wheel with the band conveyer shaft and the tucker crank shaft; the needle frame supported and sliding on the needle shafts; the lever $C^{16}$ actuated by a spring to disengage the clutch on the upper needle shaft and actuated by downward pressure of the straw band to engage said clutch; the bifurcated segmental needle, having on its back a rack engaging with cog-pinions on the needle shaft to revolve the needle in the needle frame; the jaws at the point of the needle the cam $C^{14}$ on the edge of the needle engaging with and moving the lever $m^6$ its connected fork $m^{17}$ the slide $m'$ its connected fork $m^8$, and the yoke M', to simultaneously disengage the clutches on the lower needle shaft the lower elevator shaft and the band conveyer shaft respectively; the cam $C^{15}$ on the needle engaging with the rod $m^{18}$ to move the lever $m^{11}$ to disengage the trip $m^{12}$ and engage the clutch collar $M^3$; the spring $m^{13}$ acting against the clutch collar $M^3$ and the trip $m^{12}$; the curved grain platforms supported on the upper needle shaft and the twister tube, the twister tube, the twister frame supported on the main frame, the twister shaft longitudinally adjustable within the twister tube; the darts on the twister shaft; the clutch collar and the spring on the twister tube the forked lever $d^{12}$ supported on the main frame and engaging with a collar on the twister tube to shift the tube; the twister head having guide plates and guard wires; the shield $d^9$ supported on the twister frame and telescoping into the half tube band guide on the needle frame; the roller $E^3$ on the shield; the pulleys E' and $e'$ within the shield; the barbed belt running over said pulleys; the barbed belt within the band guide running in the groove of the double cog-pinion $C^5$; the guide supported on the needle frame; the adjustable knife and tucker slide G' connected with the crank shaft $m^{10}$; the knife having its upper edge a cutting edge; the notched tucker slide F'; the rotating tucker jaws; the cam, at the point of the needle engaging with the bell crank divider lever $C^{22}$ to raise the divider fork $C^{21}$; the guide rods supported on the main frame and having bearings in which the upper elevator shaft turns; the clutch and its shifting mechanism on the upper elevator shaft operated by pins on the elevator chains; and the shifting lever fulcrumed on the main frame and connected with the needle frame; all co-operating substantially as shown and described and for the purpose stated.

35. In a straw-binder for harvesters the combination of the bifurcated needle, the needle frame within which the needle moves, the band guide on the back of the needle frame, the rack on the periphery of the needle, and the cog-pinions on the needle shafts, engaging with the rack to revolve the needle, substantially as shown and described and for the purpose stated.

36. In a straw binding harvester the combination of the main frame, the parallel needle shafts supported thereon, the segmental needle frame adjustable on the needle shafts, the shifting lever supported on the main frame and connected with the needle frame, and the curved grain receptacle supported in a position parallel to the needle frame, as set forth and for the purpose stated.

37. In a straw binding harvester the means for simultaneous lateral adjustment of the tucking and band cutting mechanism relative to the position of the needle frame, consisting of a knife, a tucker slide parallel to the knife and carrying the tucking mechanism, said knife and tucker slide both moving in a guide transverse to the needle frame, an adjustable slide with which said knife and tucker slide are both pivotally connected, a connecting rod on which said slide is adjustable, and means for actuating said rod and connected parts, as set forth and for the purpose stated.

38. In a straw binding harvester, the band guide on the back of the needle frame, the band guide under the twister shaft adapted to telescope into the lower end of the band guide on the back of the needle frame, the endless belt conveyers within said band guides and the means for actuating said conveyers, in combination with band twisting mechanism, a laterally adjustable needle frame, means for supporting said frame, on the main frame a segmental needle moving in said frame and means for driving said needle, as set forth and for the purpose stated.

39. In a straw binder for a harvester, the mechanism for twisting together the ends of the band surrounding the bundle, consisting of a suitably actuated slide moving in a guide in a direction at right angles to the plane of the needle, and provided with means for imparting rotary motion to twister jaws at one end of said slide, said rotary motion being in a plane parallel to the direction of motion of the slide, and the extent thereof being governed by the distance traversed by said slide; said mechanism co-operating with a needle carrying the band around the bundle, as set forth and for the purpose stated.

FRANK P. RICHARDS.

Witnesses:
M. W. SPEULDA,
W. T. REYNOLDS.

It is hereby certified that in Letters Patent No. 495,121, granted April 11, 1893, upon the application of Frank P. Richards, of Edinburg, Illinois, for an improvement in "Straw-Binders for Harvesters," an error appears in the printed specification requiring the following correction, viz.: On page 9, in line 92, after the word "gear," the following paragraph should be inserted: *The needle enters the upper end of the needle guide, grasps the tucker end of the band, and in revolving presses the tucker end of the band against the knife, and the band is cut off below the point where the needle jaws seized it, and the tucker jaws now having between them both ends of the band begin to rotate and twist together the ends of the band; and the tucker continuing to move inward tucks the ends under the band;* and that the said Letters Patent should be read with this correction therein that the same may conform to the record of the case in the Patent Office.

Signed, countersigned, and sealed this 9th day of May, A. D. 1893.

[SEAL.]

JNO. M. REYNOLDS,
*Assistant Secretary of the Interior.*

Countersigned:
JOHN S. SEYMOUR,
*Commissioner of Patents.*